(12) United States Patent
Weaver et al.

(10) Patent No.: US 11,105,359 B2
(45) Date of Patent: Aug. 31, 2021

(54) SHEAR PIN SUPPORTED CLEANER FINGER DESIGN

(71) Applicant: Caterpillar Inc., Deerfield, IL (US)

(72) Inventors: Nicholas Dean Weaver, Oswego, IL (US); Dakota J. Krokosz, Aurora, IL (US); Solomon James Sawlaw, Carpinteria, CA (US); Justin Thomas Clausen, Genoa, IL (US)

(73) Assignee: Caterpillar Inc., Peoria, IL (US)

( * ) Notice: Subject to any disclaimer, the term of this patent is extended or adjusted under 35 U.S.C. 154(b) by 200 days.

(21) Appl. No.: 16/181,555

(22) Filed: Nov. 6, 2018

(65) Prior Publication Data
US 2020/0141437 A1  May 7, 2020

(51) Int. Cl.
*F16B 19/02* (2006.01)
*B08B 1/00* (2006.01)
*B09B 1/00* (2006.01)

(52) U.S. Cl.
CPC .............. *F16B 19/02* (2013.01); *B08B 1/005* (2013.01); *B09B 1/00* (2013.01)

(58) Field of Classification Search
CPC ........ F16B 19/02; F16B 31/021; B08B 1/005; B09B 1/004; B09B 1/00; Y02W 30/30; E01C 19/238; B60S 1/68; A01B 29/06; Y10T 403/32951; Y10T 403/32959; Y10T 137/1669; Y10T 137/1679; Y10T 403/11
See application file for complete search history.

(56) References Cited

U.S. PATENT DOCUMENTS

| | | | | |
|---|---|---|---|---|
| 1,406,809 A * | 2/1922 | Arnold | ...................... | B60S 1/68 |
| | | | | 301/43 |
| 1,689,747 A * | 10/1928 | Olson | ....................... | B60S 1/68 |
| | | | | 280/855 |
| 1,790,006 A * | 1/1931 | Garrett | ...................... | B60S 1/68 |
| | | | | 280/855 |
| 1,872,120 A * | 8/1932 | Caskey | ...................... | B60S 1/68 |
| | | | | 280/855 |
| 1,933,679 A * | 11/1933 | Nicewander | ............... | B60S 1/68 |
| | | | | 280/855 |
| 3,554,101 A * | 1/1971 | Grant | ..................... | E02D 3/026 |
| | | | | 404/129 |
| 3,602,065 A * | 8/1971 | Ratcliff | ................... | B60P 7/083 |
| | | | | 74/524 |
| 3,837,752 A * | 9/1974 | Shewchuk | .............. | F21V 21/06 |
| | | | | 403/2 |
| 3,922,106 A * | 11/1975 | Caron | ..................... | E02D 3/026 |
| | | | | 404/121 |
| 5,122,007 A * | 6/1992 | Smith | ...................... | F16G 11/00 |
| | | | | 403/165 |
| 5,360,288 A | 11/1994 | O'Neill et al. | | |
| 5,474,408 A * | 12/1995 | Dinitz | ................... | F16B 31/021 |
| | | | | 256/13.1 |
| 6,056,471 A * | 5/2000 | Dinitz | .................... | E01F 9/681 |
| | | | | 403/2 |
| 7,163,354 B2 * | 1/2007 | Runestad | ................ | E02D 3/026 |
| | | | | 172/606 |

(Continued)

*Primary Examiner* — Steve Clemmons

(57) ABSTRACT

A shear pin supported cleaner finger assembly includes a frame member, a support member attached to the frame member, the support member defining a pivot point and a reactive point. A cleaner finger is pivotally attached to the support member at the pivot point, and a shear pin is positioned at the reactive point.

19 Claims, 7 Drawing Sheets

(56) References Cited

U.S. PATENT DOCUMENTS

| | | | |
|---|---|---|---|
| 8,726,582 B2 * | 5/2014 | Hahin | E01F 9/635 52/98 |
| 10,507,804 B1 * | 12/2019 | Chandler | E02D 3/0265 |
| 2005/0117971 A1 * | 6/2005 | Berg | E02D 3/026 404/129 |

* cited by examiner

SHEAR PIN SUPPORTED CLEANER FINGER DESIGN

TECHNICAL FIELD

The present disclosure relates to compactor machines used to compact trash and debris in landfills, and the like. Specifically, the present disclosure relates to a cleaner finger adapted to clean between the teeth of a compactor wheel on a compactor machine and the like.

BACKGROUND

Work machines known as compactors are commonly used to compress and spread material, such as trash in a landfill or dirt at a building site. Compactors often have drum-type metal wheels with a plurality of rows of replaceable teeth attached to the outside surfaces of the wheels. The teeth provide traction to the compactor, as well as concentrating the weight of the machine on a small area to increase compression force on the underlying material.

Dirt and debris can become stuck to the wheel between the teeth, particularly in damp conditions or if the soil has a high clay content, such as that found in the southwestern United States. If such debris builds up sufficiently to clog the spaces of the wheel surface between the teeth, and roughly to the height of the teeth, the teeth cannot dig into the ground. Build-up of this severity can cause loss of traction and/or poor compaction.

The generally accepted practice to avoid build-up involves mounting stationary cleaner fingers on a portion of the work machine such that, as the wheels rotate, the cleaner fingers scrape or deflect debris from between the rows of teeth before it has a chance to build up. An example of this type of cleaner finger arrangement is disclosed in U.S. Pat. No. 5,360,288, issued Nov. 1, 1994 to William N. O'Neill et al. (hereafter referenced as '288).

The '288 cleaner finger assembly includes a replaceable cleaner tooth having an arcuate upper surface, a trailing lower surface, and a fastening portion. However, the complexity of the tooth makes it expensive to produce, and the attachment method requires an operator to remove the tooth from below a mounting beam when changing the tooth, which may be an awkward or uncomfortable position for the operator.

Landfill compactor cleaner fingers are sometimes supported by M24 threaded fasteners. These threaded fasteners can remain stuck in the mounting structure when the cleaner finger fuses and breaks away when loads exerted by stuck debris push on the cleaner finger with a high force. This causes excessive downtime and cost to replace the threaded fasteners.

SUMMARY

A shear pin supported cleaner finger assembly according to an embodiment of the present disclosure may comprise a frame member, a support member attached to the frame member, the support member defining a pivot point and a reactive point. A cleaner finger is pivotally attached to the support member at the pivot point, and a shear pin is positioned at the reactive point.

A cleaner finger according to an embodiment of the present disclosure may comprise an attachment portion defining a pivot hole and a reactive hole, and a cleaning portion extending from the attachment portion and terminating in a free end. The pivot hole may define a pivot hole cylindrical axis and a pivot hole diameter, while the reactive hole may define a reactive hole cylindrical axis and a reactive hole diameter. The reactive hole cylindrical axis may be spaced away from the pivot hole cylindrical axis a reactive force lever arm distance and the free end may be spaced away from the pivot hole cylindrical axis a load lever arm distance. The reactive hole diameter may range from 5% to 15% of the load lever arm distance.

A shear pin according to an embodiment of the present disclosure may comprise a body including a cylindrical configuration defining a shear pin cylindrical axis, a shear pin circumferential direction, a shear pin radial direction, a first axial end, and a second axial end. The body may further include a first circumferential notch spaced axially away from the first axial end defining a first end portion, and a second circumferential notch spaced axially away from the second axial end defining a second end portion. The first circumferential notch may also be spaced axially away from the second circumferential notch defining an intermediate portion. The first end portion may define a first end portion axial length, the second end portion may define a second end portion axial length, and the intermediate portion may define an intermediate portion axial length. The first end portion axial length may be equal to the second end portion axial length, and a ratio of the first end portion axial length divided by the intermediate portion axial length may range from 0.5 to 0.7.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
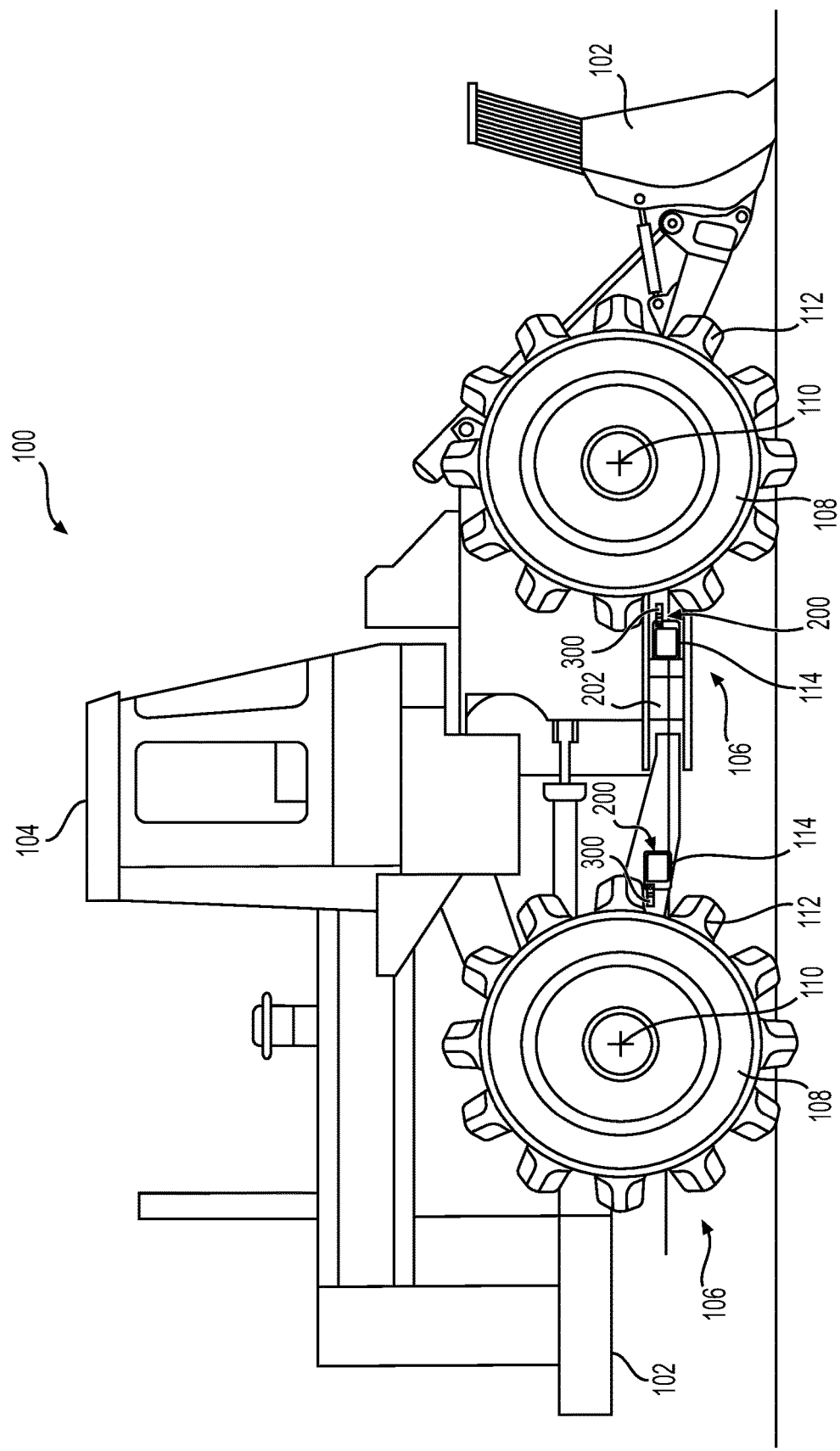
FIG. 1 is a front view of a compactor machine using a shear pin supported cleaner finger assembly according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of a compactor machine, a shear pin supported cleaner finger assembly, a cleaner finger, and a shear pin according to various embodiments of the present disclosure will now be described. In some embodiments, the various components are made from various steel alloys, allowing them to be durable.

Referring first to FIG. 1, a work machine 100 includes a machine body 102, an operator compartment 104 carried by the machine body 102, and a ground-engaging system (shown generally at 106) providing motive power to the machine body 102. The ground-engaging system 106 (may also be referred to as an undercarriage) includes at least one wheel 108 having a wheel axis (shown end-on at 110). At least one compactor tooth 112 is attached to the wheel 108. Preferably, a plurality of compactor teeth 112 are arranged in circumferential rows. The wheel 108 may oscillate or rotate as the work machine 100 travels. The ground-engaging system 106 may also include at least one wheel cleaner assembly 114 set forth in detail below. This assembly 114 may include a shear pin supported finger cleaner assembly 200 including a mounting beam (may also be referred to as a frame member 202) and a cleaner finger 300.

The wheel cleaner assembly 114 may be mounted in front of or behind the wheel 108. In addition, multiple wheel cleaner assemblies 114 can be associated with each wheel 108. Furthermore, each wheel cleaner assembly 114 may be mounted at any suitable angle with respect to the wheel axis 110. The configuration shown in FIG. 1 is for exemplary purposes only but indicates that this angle may be substantially horizontal for some embodiments.

Figure 2:
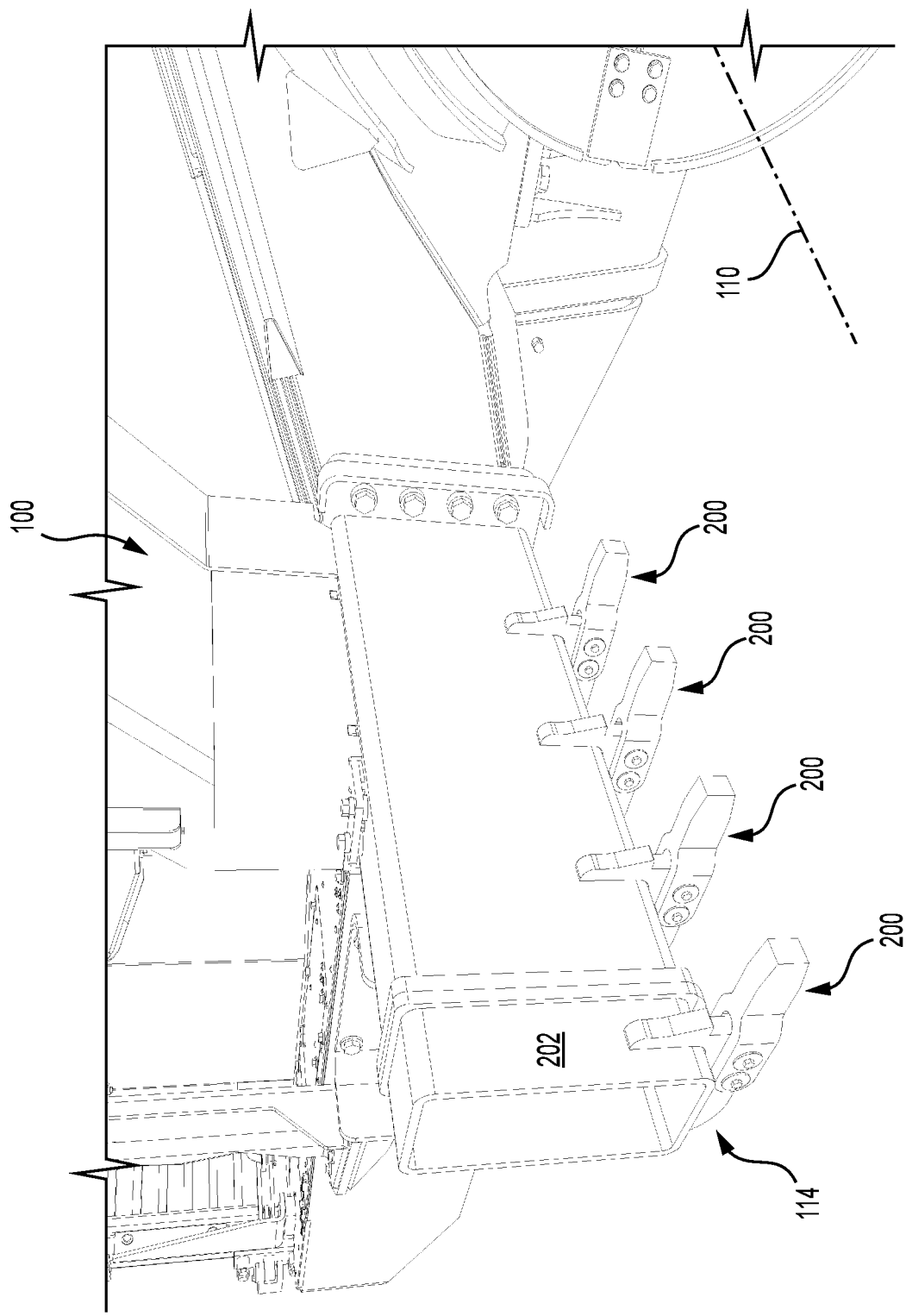
FIG. 2 is a perspective view of a plurality of shear pin supported cleaner finger assemblies used by the compactor machine of FIG. 1.

FIG. 2 illustrates that a plurality of shear pin supported cleaner finger assemblies 200 may be provided that are positioned along the wheel axis 110 and appropriately spaced to fit between the various circumferential rows of the teeth 112 of the wheel 108 (best seen in FIG. 1).

Focusing now on FIGS. 3 and 4, a shear pin supported cleaner finger assembly 200 according to an embodiment of the present disclosure will now be discussed in detail. The assembly 200 may comprise a frame member 202, and a support member 204 attached to the frame member 202 (via welding, fastening, etc.). The support member 204 may define a pivot point 206 and a reactive point 208. A cleaner finger 300 may be pivotally attached to the support member 204 at the pivot point 206. A shear pin 400 may be positioned at the reactive point 208 (best understood when looking at FIGS. 3 and 5 thru 7.

Figure 3:
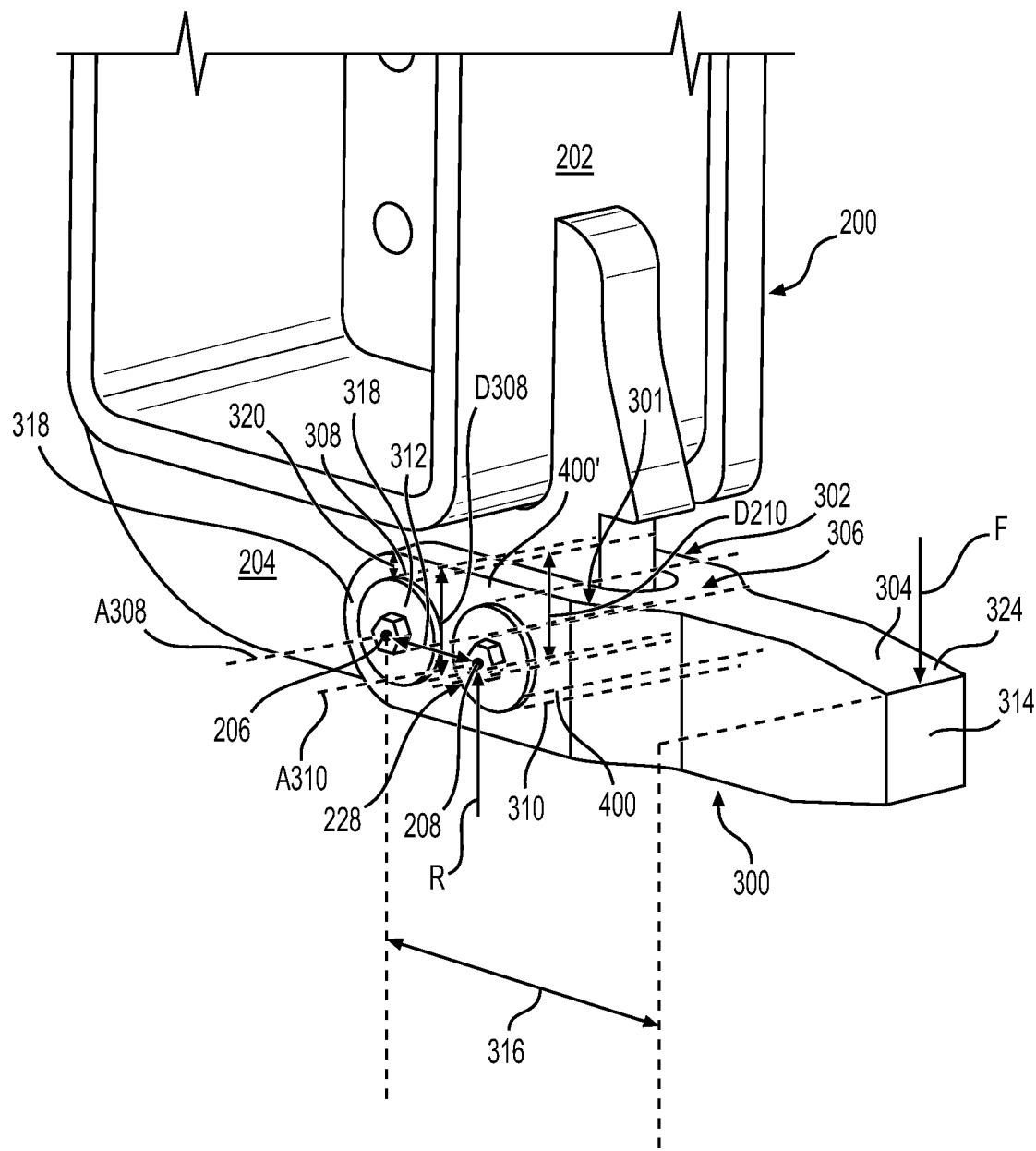
FIG. 3 is a perspective view of a single instance of a shear pin supported cleaner finger assembly of FIG. 2 shown in isolation from the compactor machine, illustrating the cleaner finger in an engaged position (e.g. a horizontal position) for cleaning.
Figure 5:
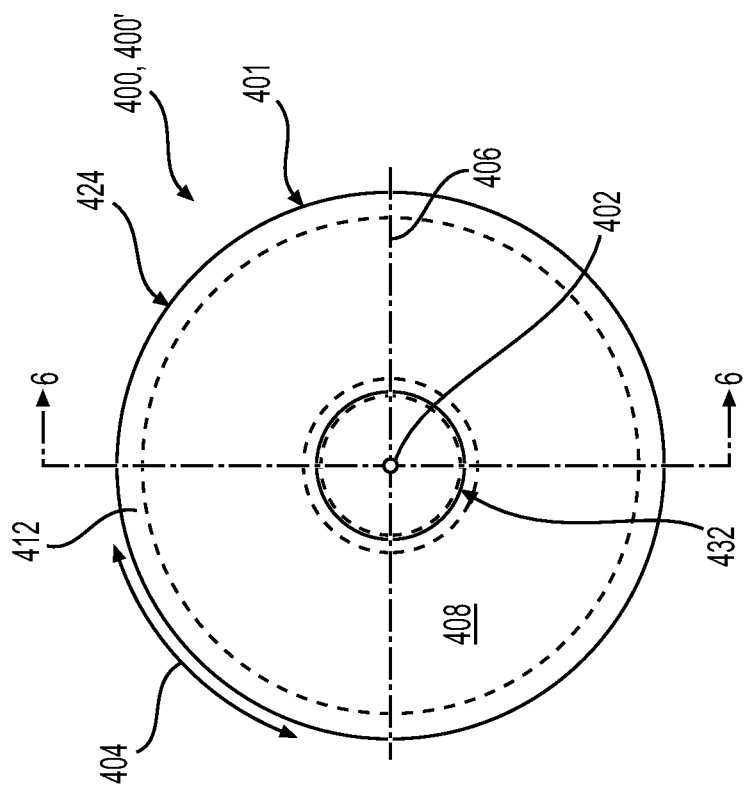
FIG. 5 is a front view of a shear pin according to an embodiment of the present disclosure that may be used to support a cleaner finger.
Figure 6:
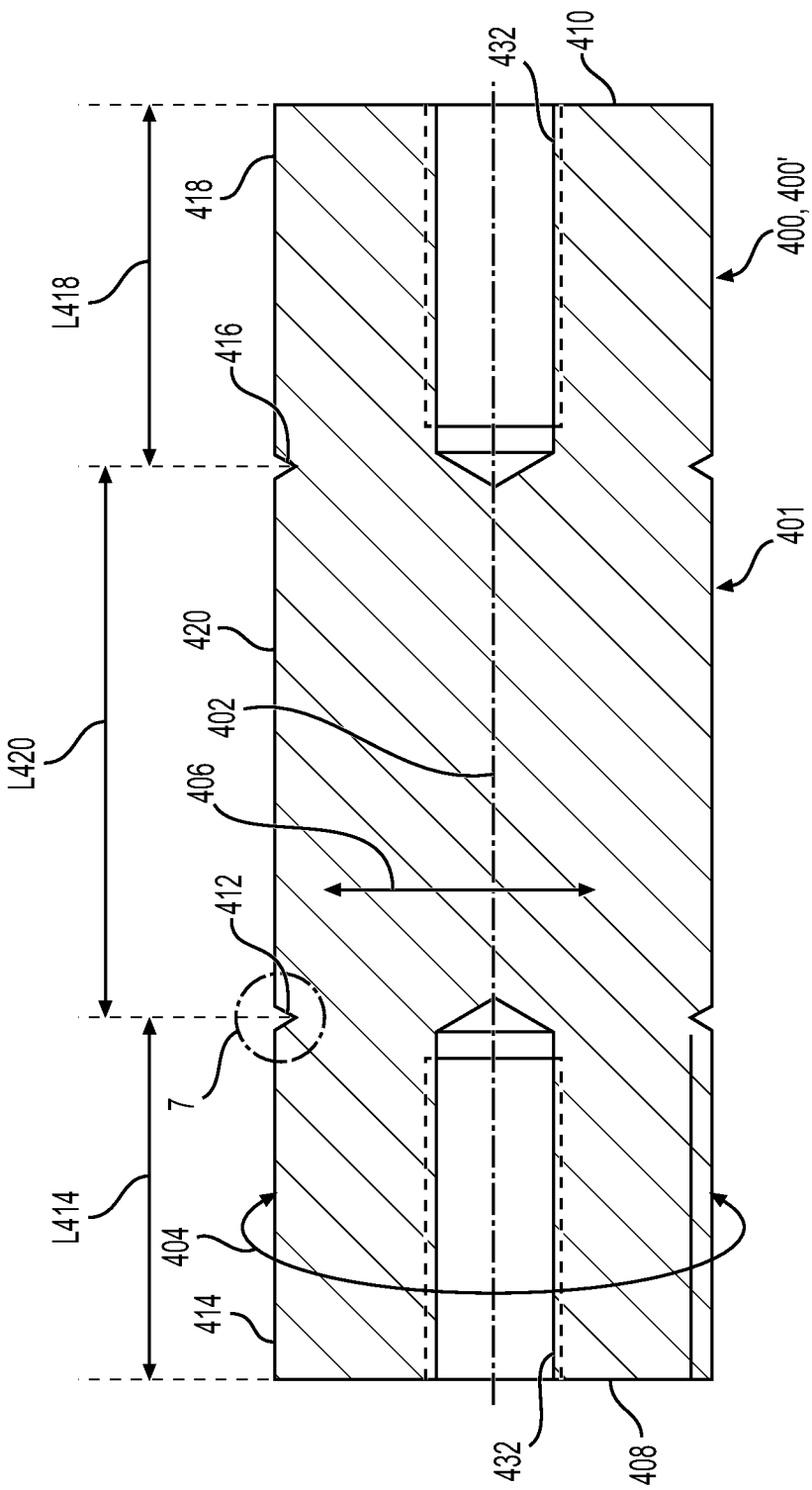
FIG. 6 is a sectional view of the shear pin of FIG. 5.

As shown in FIG. 3, the shear pin 400 may contact the cleaner finger 300. As best seen in FIGS. 5 and 6, the shear pin 400 may include a cylindrical configuration defining a shear pin cylindrical axis 402, a shear pin circumferential direction 404, a shear pin radial direction 406, a first axial end 408, and a second axial end 410. The shear pin 400 may further include a first circumferential notch 412 spaced axially away from the first axial end 408 defining a first end portion 414, and a second circumferential notch 416 spaced axially away from the second axial end 410 defining a second end portion 418. The first circumferential notch 412 may also be spaced axially away from the second circumferential notch 416 defining an intermediate portion 420.

In addition, the first end portion 414 may define a first end portion axial length L414, the second end portion 418 may define a second end portion axial length L418, while the intermediate portion 420 may define an intermediate portion axial length L420. The first end portion axial length L414 may be equal to the second end portion axial length L418, and a ratio of the first end portion axial length L414 divided by the intermediate portion axial length L420 may range from 0.5 to 0.7 and may be approximately 0.6 in some embodiments. Exemplary values for the end portion axial lengths L414, L418 may be 15 mm to 25 mm and may be approximately 21 mm in some embodiments while exemplary values for the intermediate portion axial length L420 may range from 25 mm to 40 mm and may be approximately 32 mm in some embodiments. The axial width of the notches may be neglected or excluded from these lengths when making these measurements. These ratios and dimensions may be varied as needed or desired to be different in other embodiments.

Figure 7:
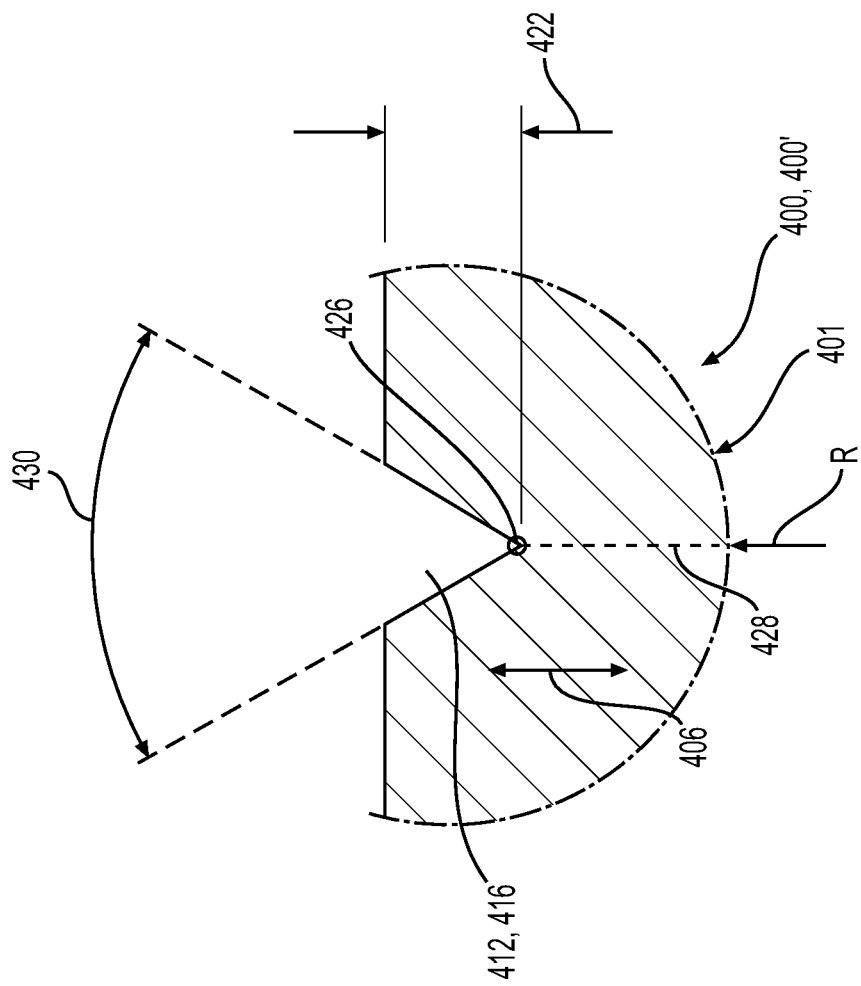
FIG. 7 is an enlarged detail view of a notch of the shear pin of FIG. 6.

In some embodiments as best seen in FIG. 7, the first circumferential notch 412 and the second circumferential notch 416 may have identical configurations and define a notch depth 422 measured in the shear pin radial direction 406. The shear pin 400 may also define an outer diameter 424 (see FIG. 5), and a ratio of the outer diameter 424 divided by the notch depth 422 may range from 19 to 23 in some embodiments. Exemplary values for the notch depth 422 may range from 1.0 mm to 1.4 mm and may be approximately 1.2 mm in some embodiments. Likewise, the outer diameter 424 may be approximately 25 mm in some embodiments. These ratios and dimensions may be varied as needed or desired to be different in other embodiments.

Focusing on FIG. 7, either notch 412, 414 may have a V-shaped configuration and the point 426 of the notch 412, 414 may concentrate stress to a radial shear plane 428 to help ensure that sufficient stress can be generated that will sever the shear pin 400 when a great enough reactive force R is generated by a load F exerted on the cleaner finger 300 (see FIG. 3) as will be discussed in more detail later herein. The notch 412, 414 may define an included angle 430 ranging from 50 degrees to 70 degrees and may be approximately 60 degrees in some embodiments (included angle 430 may be symmetrical about the radial shear plane 428). These shapes and dimensions may be varied as needed or desired to be different in other embodiments.

The shear pin 400 may be manufactured from ASTM A656 Grade 50 alloy steel in some embodiments and may not be hardened. Other materials are possible and other treatments including heat treating may be employed to change the properties of the shear pin 400 if needed or desired in other embodiments.

Figure 4:
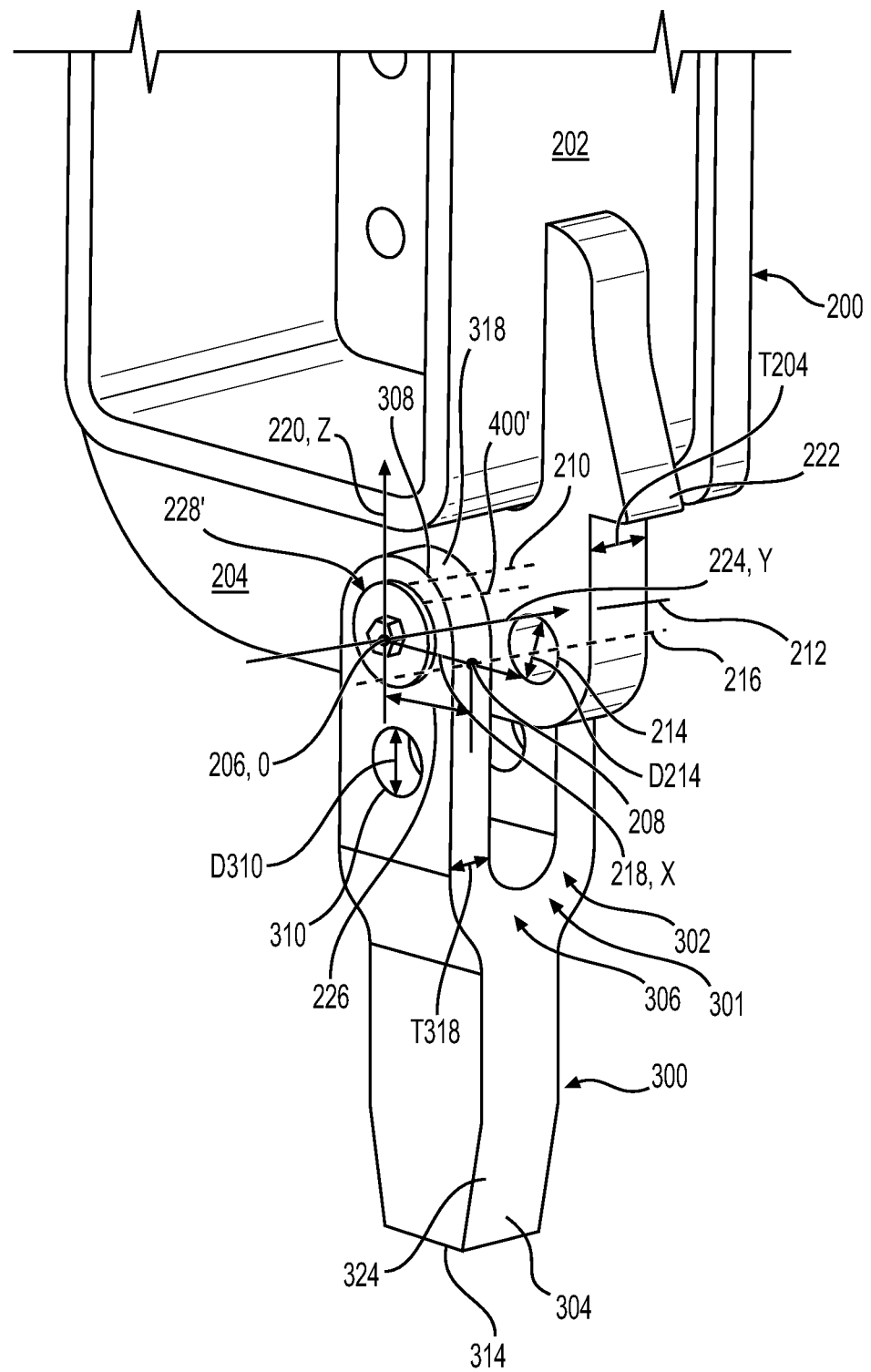
FIG. 4 is similar to FIG. 3 except that shear pin has been sheared and fallen away, allowing the cleaner finger to drop into a disengaged position (e.g. a downward vertical direction) such that the cleaner finger is no longer cleaning the compactor wheel.

Referring now to FIG. 4, the support member 204 may define a first thru-hole 210 defining a first longitudinal axis 212 passing through the pivot point 206 and a second thru-hole 214 defining a second longitudinal axis 216 passing through the reactive point 208. The first thru-hole 210 may define a first thru-hole diameter D210 while the second thru-hole 214 may define a second thru-hole diameter D214 that is less than the first thru-hole diameter D210. This allows the first thru-hole to accommodate a larger diameter pin (e.g. a pivot pin 400') than the shear pin 400 that is inserted into the second thru-hole 214 for reasons that will be explained in more detail later herein.

The support member 204 may also be manufactured from ASTM A656 Grade 50 alloy steel in some embodiments and may not be hardened. Other materials are possible and other treatments including heat treating may be employed to change the properties of the support member 204 if needed or desired in other embodiments.

Moreover, the support member 204 may define a first direction 218 passing through the reactive point 208 and the pivot point 206 (that is to say that the first direction 218 may be coextensive with the X axis of the Cartesian coordinate system with its origin O placed at the pivot point 206), while also defining a second direction 220 that is perpendicular to the first direction 218 and the first longitudinal axis 212 (that is to say second direction 220 may be coextensive with the Z axis of the Cartesian coordinate system). The support member 204 may further include a stop portion 222 disposed above the cleaner finger 300 along the second direction 220. The stop portion 222 may resemble a nose that projects from support member 204 along the X axis (or first direction 218). Other configurations for these features may be provided in other embodiments.

The support member 204 may further define a third direction 224 that is perpendicular to the second direction 220 and the first direction 218 and parallel with the first longitudinal axis 212 (that is to say the third direction 224 may be coextensive with the Y axis). The support member 204 may further define a thickness T204 measured along the second direction 224 ranging from 25 mm to 40 mm in some embodiments. Similarly, the support member 204 may define a first distance 226 measured along the first direction 218 from the pivot point 206 to the reactive point 208 ranging from 50 mm to 100 mm.

Looking at FIGS. 3 and 4, the cleaner finger 300 of the assembly 200 may include a clevis portion 302 and a cleaning portion 304 extending from the clevis portion 302, forming a Y-shaped member 306. Other configurations are possible such as those where a two-legged clevis portion is omitted. The cleaner finger 300 defines a pivot hole 308 (so called as it is configured to accommodate a pivot pin 400' that serves the function of allowing the cleaner finger 300 to pivot when the shear pin 400 is sheared as shown in FIG. 4) extending completely through the clevis portion 302 and a reactive hole 310 (so called as a reactive force R is generated by the load force F on the shear pin 400 that is accommodated by this hole) extending completely through the clevis portion 302.

Consequently, the reactive hole 310 may define a reactive hole cylindrical axis A310 and a reactive hole diameter D310, while the pivot hole 308 may define a pivot hole cylindrical axis A308 and pivot hole diameter D308 that is greater than the reactive hole diameter D310. More particularly, the reactive hole diameter D310 may match the second thru-hole diameter D214 to receive the shear pin 400 while the pivot hole diameter D308 may match the first thru-hole diameter D210 to receive the pivot pin 400'. Other constructions and configurations are possible. It is to be understood that the various holes would line up appropriately and be slightly larger than the outside diameters of the pins to allow the pins to be easily inserted therein (e.g. a slip fit may be provided between the pins and the holes, etc.).

Focusing on FIG. 3, the reactive hole cylindrical axis A310 may be spaced away from the pivot hole cylindrical axis A308 a reactive force lever arm distance 312 that is the minimum distance measured from the reactive hole cylindrical axis A310 to the pivot hole cylindrical axis A308. Also, the cleaner finger 300 may define a free end 314 and the reactive hole 310 may be disposed between the free end 314 and the pivot hole 308 along a direction parallel to the reactive force lever arm distance 312. This may not be the case for other embodiments. The cleaner finger 300 may further define a load lever arm distance 316 measured from the free end 314 to the pivot hole cylindrical axis A308 along the direction parallel to the reactive force lever arm distance 312. The reactive hole diameter D310 may range from 5% to 15% of the load lever arm distance 316.

A pair of bolt and washer assemblies 228, 228' may be used on the front side of the assembly 200 and another pair on the back side (not shown) to hold the pivot pin 400' and the shear pin 400 in place. The threaded holes 432 of the shear pin 400 configured to receive the bolts are shown in FIGS. 5 and 6. The depth of the threaded holes may designed so that a bolt will not extend to the radial shear plane 428 of the shear pin 400'. Other methods of retention may be used in other embodiments.

An embodiment of a cleaner finger 300 according to an embodiment of the present disclosure may be described as follows with reference to FIGS. 3 and 4. The cleaner finger 300 may be manufactured from an alloy steel that is hardened to Rockwell Scale C 40-49. Other types of materials and harnesses may be used for the cleaner finger. The cleaner finger 300 may comprise an attachment portion 318 defining a pivot hole 308 and a reactive hole 310, and a cleaning portion 304 extending from the attachment portion 318 and terminating in a free end 314.

As alluded to earlier herein, the pivot hole 308 may define a pivot hole cylindrical axis A308 and a pivot hole diameter D308, while the reactive hole 310 may define a reactive hole cylindrical axis A310 and a reactive hole diameter D310. The reactive hole cylindrical axis A310 may be spaced away from the pivot hole cylindrical axis A308 a reactive force lever arm distance 312 and the free end 314 may be spaced away from the pivot hole cylindrical axis A308 a load lever arm distance 316, and the reactive hole diameter D310 may range from 5% to 15% of the load lever arm distance 316.

This percentage may guide the designer to adjust the reactive hole diameter and the outer diameter of the shear pin so that they are appropriately sized based on the lever arm distances and the load force. If the load force is increased, the reactive force lever arm is decreased, or the load force lever arm is increased, then a larger diameter may be warranted. Conversely, if the load force is decreased, or the reactive force lever arm is increased, or the load force lever arm is decreased, then a smaller diameter may be warranted. This relationship of these variables may be expressed mathematically per the following equation:

$$D310 \alpha ((Fx316)/312)$$

In some embodiments such as those shown in FIGS. 3 and 4, the reactive force lever arm distance 312 and load F cannot be adjusted significantly. So, the previous equation may be altered as follows to neglect the reactive force lever arm distance 312 and load F: $D310 \alpha 316$.

Other configurations that fall outside this percentage are possible in other embodiments.

The pivot hole diameter D308 may be greater than the reactive hole diameter D310. The attachment portion 318 may be straight, or the cleaner finger 300 may include a body 301 that jogs such that the cleaning portion 304 is offset from the attachment portion 318 along the pivot hole cylindrical axis A308. In such an embodiment, a double-legged clevis portion 302 may be omitted (e.g. an S-shaped or Z-shaped member may be provided). However, as shown in FIGS. 3 and 4, the attachment portion 318 may include a clevis portion 302 such as one having two legs and that forms a Y-shaped member 306 with the cleaning portion 304. The pivot hole 308 and the reactive hole 310 may extend completely through the clevis portion 302 in some embodiments but not in other embodiments.

As best seen in FIG. 3, the reactive force lever arm distance 312 may range from 50 mm to 100 mm and the load force lever arm distance 316 may range from 230 mm to 240 mm. Also, the attachment portion 318 may define defines a thickness T318 along the pivot hole cylindrical axis A308 that ranges from 15 mm to 25 mm. The attachment portion 318 may also define a minimum offset distance 320 measured from the pivot hole 308 to a free edge 322 along a direction perpendicular to the reactive force lever arm distance 312 and the pivot hole cylindrical axis A308 (e.g. in the Z direction). This minimum offset distance 320 may range from 20 mm to 40 mm in some embodiments. These dimensions and configurations may altered as needed or desired in other embodiments.

In some embodiments, the cleaner finger 300 includes an angled surface 324 that extends from the free end 314 of the cleaning portion 304 that is configured to remove debris from the compactor wheel. Furthermore, the cleaner finger may define one or more planes of symmetry, such as the X-Y plane shown in FIG. 3 and a plane parallel to X-Z plane. In such a case, the cleaner finger 300 may be rotated about an axis parallel to the X axis and still provide the same functionality. These features may be modified or omitted in other embodiments.

A shear pin 400 (or pivot pin 400') according to an embodiment of the present disclosure will now be discussed looking at FIGS. 5 thru 7. It is to be understood that the term "shear pin" may include the term "pivot pin" (that is to say that "pivot pin" may be a subset or an example of a shear pin) in some embodiments the pivot pin is similarly or identically constructed as the shear pin and is designed to shear after the shear pin has been severed. For example, if the load F was applied to the underside of the cleaning portion of the cleaner finger, then when the shear pin is severed, the pivot pin may be designed to also shear off to prevent damage to the support member once the cleaner finger has contacted the stop portion of the support member.

The shear pin 400 (or pivot pin 400') may comprise a body 401 including a cylindrical configuration defining a shear pin cylindrical axis 402, a shear pin circumferential direction 404, a shear pin radial direction 406, a first axial end 408, and a second axial end 410. The body 401 may further include a first circumferential notch 412 spaced axially away from the first axial end 408 defining a first end portion 414, and a second circumferential notch 416 spaced axially away from the second axial end 410 defining a second end portion 418. The first circumferential notch 412 also being spaced axially away from the second circumferential notch 416 defining an intermediate portion 420.

The first end portion 414 may define a first end portion axial length L414, the second end portion 418 may define a second end portion axial length L418, and the intermediate portion 420 may define an intermediate portion axial length L420. The first end portion axial length L414 may be equal to the second end portion axial length L416, and a ratio of the first end portion axial length L414 divided by the intermediate portion axial length L420 ranges from 0.5 to 0.7.

The first circumferential notch 412 and the second circumferential notch 412 may also have identical configurations and define a notch depth 422 measured in the shear pin radial direction 406. The shear pin 400 defines an outer diameter 424, and a ratio of the outer diameter 424 divided by the notch depth 422 may range from 19 to 23. These dimensions and ratios may be altered to be different in other embodiments.

Any of the configurations, materials, material properties, dimensions, and ratios of dimensions mentioned herein may be altered in various embodiments of the present disclosure to have different values or characteristics than what has been specifically mentioned herein or shown in the drawings.

INDUSTRIAL APPLICABILITY

In practice, a work machine, a shear pin supported cleaner finger assembly, a cleaner finger, and a shear pin/pivot pin according to any embodiment described herein may be sold, bought, manufactured or otherwise obtained in an OEM (original equipment manufacturer) or after-market context.

For example, the support member, shear pin/pivot pin and the cleaner finger may be provided or sold as replacement parts or retrofits to machines already in the field, etc. Alternatively, a work machine such as a compactor may be sold with the shear pin supported cleaner finger assembly already attached to the machine, etc.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A shear pin supported cleaner finger assembly comprising:
   a frame member;
   a support member attached to the frame member, the support member defining a pivot point and a reactive point;
   a cleaner finger pivotally attached to the support member at the pivot point, the cleaner finger having an attachment portion defining a single pivot hole and a reactive hole and a cleaning portion extending from the attachment portion and terminating in a free end, wherein the reactive hole is disposed between pivot hole and the free end; and
   a shear pin positioned at the reactive point in the reactive hole;
   wherein the support member defines a first thru-hole defining a first longitudinal axis passing through the pivot point and a first thru-hole diameter, and a second thru-hole defining a second longitudinal axis passing through the reactive point and a second thru-hole diameter that is less than the first thru-hole diameter.

2. The shear pin supported cleaner finger assembly of claim 1 wherein the shear pin is contacting the cleaner finger, and the shear pin includes a cylindrical configuration defining
   a shear pin cylindrical axis,
   a shear pin circumferential direction,
   a shear pin radial direction,
   a first axial end defining a first threaded hole having a depth, and
   a second axial end defining a second threaded hole having a depth, the shear pin further including
   a first circumferential notch spaced axially away from the first axial end defining a first end portion by a distance that is greater than the depth of the first threaded hole, and
   a second circumferential notch spaced axially away from the second axial end defining a second end portion by a distance that is greater than the depth of the second threaded hold, the first circumferential notch also being spaced axially away from the second circumferential notch defining an intermediate portion.

3. The shear pin supported cleaner finger assembly of claim 2 wherein the first end portion defines a first end portion axial length, the second end portion defines a second end portion axial length, the intermediate portion defines an intermediate portion axial length, the first end portion axial length is equal to the second end portion axial length, and a ratio of the first end portion axial length divided by the intermediate portion axial length ranges from 0.5 to 0.7.

4. The shear pin supported cleaner finger assembly of claim 3 wherein the first circumferential notch and the second circumferential notch have identical configurations and define a notch depth measured in the shear pin radial direction, and the shear pin defines an outer diameter, and a ratio of the outer diameter divided by the notch depth ranges from 19 to 23.

5. The shear pin supported cleaner finger assembly of claim 1 wherein the support member defines a first direction passing through the reactive point and the pivot point, also defining a second direction that is perpendicular to the first direction and perpendicular to the first longitudinal axis, the support member further including a stop portion disposed above the cleaner finger along the second direction.

6. The shear pin supported cleaner finger assembly of claim 5 wherein the support member further defines a third direction perpendicular to the first direction and the second direction and parallel with the first longitudinal axis, the support member further defining a thickness measured along the second direction ranging from 25 mm to 40 mm.

7. The shear pin supported cleaner finger assembly of claim 5 wherein the support member defines a first distance measured along the first direction from the pivot point to the reactive point ranging from 50 mm to 100 mm.

8. The shear pin supported cleaner finger assembly of claim 1 wherein the cleaner finger includes a clevis portion and a cleaning portion extending from the clevis portion, forming a Y-shaped member.

9. The shear pin supported cleaner finger assembly of claim 8 wherein the cleaner finger defines a pivot hole extending completely through the clevis portion and a reactive hole extending completely through the clevis portion.

10. The shear pin supported cleaner finger assembly of claim 9 wherein the reactive hole defines a reactive hole cylindrical axis and a reactive hole diameter, and the pivot hole defines a pivot hole cylindrical axis and a pivot hole diameter that is greater than the reactive hole diameter, and the reactive hole cylindrical axis is spaced away from the pivot hole cylindrical axis a reactive force lever arm distance measured from the reactive hole cylindrical axis to the pivot hole cylindrical axis.

11. The shear pin supported cleaner finger assembly of claim 10 wherein the cleaner finger defines a free end and the reactive hole is disposed between the free end and the pivot hole along a direction parallel to the reactive force lever arm distance, and the cleaner finger further defining a load lever arm distance measured from the free end to the pivot hole cylindrical axis along the direction parallel to the reactive force lever arm distance.

12. The shear pin supported cleaner finger assembly of claim 11 wherein the reactive hole diameter ranges from 5% to 15% of the load lever arm distance.

13. A cleaner finger comprising:
   an attachment portion defining a pivot hole and a reactive hole; and
   a cleaning portion extending from the attachment portion and terminating in a free end;
   wherein the reactive hold is disposed between the pivot hole and the free end; and
   wherein the pivot hole defines a pivot hole cylindrical axis and a pivot hole diameter, the reactive hole defines a reactive hole cylindrical axis and a reactive hole diameter, and the reactive hole cylindrical axis is spaced away from the pivot hole cylindrical axis a reactive force lever arm distance and the free end is spaced away from the pivot hole cylindrical axis a load lever arm distance, and the reactive hole diameter ranges from 5% to 15% of the load lever arm distance, and the pivot hole diameter is greater than the reactive hole diameter.

14. The cleaner finger of claim 13 wherein the cleaner finger includes a body that jogs such that the cleaning portion is offset from the attachment portion along the pivot hole cylindrical axis.

15. The cleaner finger of claim 14 wherein the attachment portion includes a clevis portion and that forms a Y-shaped member with the cleaning portion and the pivot hole and the reactive hole extend completely through the clevis portion.

16. The cleaner finger of claim 13 wherein the reactive force lever arm distance ranges from 50 mm to 100 mm and the load force lever arm distance ranges from 230 mm to 240 mm.

17. The cleaner finger of claim 13 wherein the attachment portion defines a thickness along the pivot hole cylindrical axis that ranges from 15 mm to 25 mm and a minimum offset distance measured from the pivot hole to a free edge along a direction perpendicular to the reactive force lever arm and the pivot hole cylindrical axis ranging from 20 mm to 40 mm.

18. A shear pin comprising:
   a body including
      a cylindrical configuration defining a shear pin cylindrical axis, a shear pin circumferential direction, a shear pin radial direction,
      a first axial end defining a first threaded hole having a depth, and a second axial end defining a second threaded hole having a depth,
      the body further including a first circumferential notch spaced axially away from the first axial end defining a first end portion by a distance that is greater than the depth of the first threaded hole, and
      a second circumferential notch spaced axially away from the second axial end defining a second end portion by a distance that is greater than the depth of the second threaded hole, the first circumferential notch also being spaced axially away from the second circumferential notch defining an intermediate portion;

wherein the first end portion defines a first end portion axial length, the second end portion defines a second end portion axial length, the intermediate portion defines an intermediate portion axial length, the first end portion axial length is equal to the second end portion axial length, and a ratio of the first end portion axial length divided by the intermediate portion axial length ranges from 0.5 to 0.7.

19. The shear pin of claim 18 wherein the first circumferential notch and the second circumferential notch have identical configurations and define a notch depth measured in the shear pin radial direction, and the shear pin defines an outer diameter, and a ratio of the outer diameter divided by the notch depth ranges from 19 to 23.

\* \* \* \* \*